United States Patent
Bühler et al.

(10) Patent No.: US 9,871,368 B2
(45) Date of Patent: Jan. 16, 2018

(54) ENCAPSULATED SURGE PROTECTION DEVICE CAPABLE OF CARRYING LIGHTNING CURRENTS AND LIMITING FOLLOW CURRENTS AND COMPRISING AT LEAST ONE SPARK GAP

(71) Applicant: DEHN + SÖHNE GMBH + CO. KG, Neumarkt/Opf. (DE)

(72) Inventors: Klaus Bühler, Eckental (DE); Stefanie Schreiter, Neumarkt (DE); Jens Ehrler, Neumarkt (DE); Arnd Erhardt, Neumarkt (DE)

(73) Assignee: DEHN + SÖHNE GMBH + CO. KG, Neumarkt/Opf. (DE)

( * ) Notice: Subject to any disclaimer, the term of this patent is extended or adjusted under 35 U.S.C. 154(b) by 476 days.

(21) Appl. No.: 14/411,183

(22) PCT Filed: May 7, 2013

(86) PCT No.: PCT/EP2013/059441
§ 371 (c)(1),
(2) Date: Dec. 24, 2014

(87) PCT Pub. No.: WO2014/005747
PCT Pub. Date: Jan. 9, 2014

(65) Prior Publication Data
US 2015/0207308 A1   Jul. 23, 2015

(30) Foreign Application Priority Data

Jul. 4, 2012  (DE) .................. 10 2012 105 984
Dec. 18, 2012  (DE) .................. 10 2012 112 480

(51) Int. Cl.
*H02H 7/24* (2006.01)
*H02H 3/08* (2006.01)
(Continued)

(52) U.S. Cl.
CPC .................. *H02H 3/08* (2013.01); *H01T 2/02* (2013.01); *H02H 9/041* (2013.01); *H02H 9/06* (2013.01)

(58) Field of Classification Search
USPC ......................................... 361/112
See application file for complete search history.

(56) References Cited

U.S. PATENT DOCUMENTS 4,678,885 A * 7/1987 Dresti .................... B23H 1/022
219/69.13
4,949,696 A * 8/1990 Muller .................... F02P 1/086
123/600
(Continued)

FOREIGN PATENT DOCUMENTS

DE       1947349       4/1971     ............... H02H 3/20
DE       196 40 997    4/1998     ............... H02H 9/06
(Continued)

OTHER PUBLICATIONS

First Office Action (in German), dated Mar. 28, 2017, issued by the German Patent Office for Applicant's corresponding German Patent Application No. DE 10 2012 112 480.9, filed Dec. 18, 2012.
(Continued)

*Primary Examiner* — Ronald W Leja
(74) *Attorney, Agent, or Firm* — Bodner & O'Rourke, LLP; Gerald T. Bodner; Christian P. Bodner

(57) ABSTRACT

The invention relates to an encapsulated surge protection device capable of carrying lightning currents and limiting follow currents and comprising at least one spark gap, which has in each case at least two main electrodes and one auxiliary electrode, which is connected to a starting device for triggering in the event of transient surges. The invention provides a second starting device which is independent of the first starting device and which can activate the spark gap without the need for the presence of surges or pulse currents
(Continued)

on the basis of the presence of a minimum voltage between the main electrodes of the spark gap.

15 Claims, 7 Drawing Sheets

(51) Int. Cl.
*H01T 2/02* (2006.01)
*H02H 9/04* (2006.01)
*H02H 9/06* (2006.01)

(56) References Cited

U.S. PATENT DOCUMENTS

| | | | | |
|---|---|---|---|---|
| 5,995,352 | A * | 11/1999 | Gumley | H02H 9/06 361/111 |
| 9,640,951 | B2 * | 5/2017 | Suchy | H01T 4/02 |
| 2007/0165351 | A1 | 7/2007 | Menke | 361/117 |
| 2008/0239598 | A1 * | 10/2008 | Asokan | H01T 2/02 361/56 |
| 2009/0213504 | A1 * | 8/2009 | Hallstrom | H01T 15/00 361/16 |
| 2012/0112872 | A1 * | 5/2012 | Kang | H01C 7/10 338/21 |
| 2015/0236483 | A1 * | 8/2015 | Suchy | H01T 15/00 361/37 |

FOREIGN PATENT DOCUMENTS

| | | | | |
|---|---|---|---|---|
| DE | 19838776 | 3/2000 | | H02H 9/06 |
| DE | 10211795 | 7/2003 | | H01T 2/02 |
| DE | 102 45 144 | 1/2004 | | H01T 2/02 |
| DE | 10 2004 006 988 | 6/2005 | | H01T 2/02 |
| DE | 102004002582 | 8/2005 | | H01T 1/20 |
| EP | 1976077 | 10/2008 | | H01T 2/02 |
| FR | 2544923 | 10/1984 | | H02H 9/06 |
| WO | WO2007/003706 | 1/2007 | | H01T 15/00 |

OTHER PUBLICATIONS

Osmokrovic, et al.: "Triggered three-electrode spark gaps", 1995 Pulsed Power Conference—Albuquerque, Jul. 3-6, 1995; [Pulsed Power Conference], New York, IEEE, US, vol. 2, Jul. 3, 1995 (Jul. 3, 1995), pp. 822-827, XP010227771, DOI: 10.1109/PPC.1995. 599713, ISBN: 978-0-7803-2791-7, Abstract; Figure 4. Abstract and publication available at: http://ieeexplore.ieee.org/xpl/login. jsp?tp=&arnumber=599713&url=http%3A%2F%2Fieeexplore. ieee.org%2Fxpls%2Fabs_all.jsp%3Farnumber%3D599713 (last accessed: Feb. 25, 2015).

Notification Concerning Transmittal of International Preliminary Report on Patentability (Chapter I of the Patent Cooperation Treaty), in English, dated Jan. 15, 2015, the International Preliminary Report on Patentability with the Written Opinion of the International Searching Authority, in English, dated Jul. 9, 2013, and the International Search Report, in English, dated Jul. 9, 2013, which were issued by the International Bureau of WIPO for Applicant's corresponding PCT Application No. PCT/EP2013/ 059441, filed on May 7, 2013.

Blitz, elektromagnetisch, Schutz, Elektrotechnik, *"Protection Against Lightning Electromagnetic Impulse—Part 1: General Principles"*, VDE 0185, vol. 103, Sep. 1997, DIN Deutsches Institut für Normung e.V., Berlin 10625, pp. 2-33.

*"Protection Against Lightning Electromagnetic Impulse (LEMP)— Part 3: Requirements of Surge Protective Devices (SPDs)"*, VDE 0185, vol. 106, Apr. 1999, DIN Deutsches Institut für Normung e.V., Berlin 10625, pp. 2-45.

*"Protection Against Lightning Electromagnetic Impulse (LEMP)— Part 3: Requirements of Surge Protective Devices (SPDs)—Amendment 1: Coordination of SPD within existing Structures"*, VDE 0185, vol. 106/A1, Apr. 1999, DIN Deutsches Institut für Normung e.V., Berlin 10625, pp. 2-12.

* cited by examiner

ENCAPSULATED SURGE PROTECTION DEVICE CAPABLE OF CARRYING LIGHTNING CURRENTS AND LIMITING FOLLOW CURRENTS AND COMPRISING AT LEAST ONE SPARK GAP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to an encapsulated overvoltage protection device capable of carrying lightning currents and limiting follow currents, and comprising at least one spark gap which respectively has at least two main electrodes and one auxiliary electrode which is connected to an ignition device for triggering in the event of transient overvoltages, according to the claims.

(2) Description of Related Art

The requirements in respect of transient overvoltage protection for power supply systems are specified in standards (DIN EN 61643-11) and insulation coordination (DIN EN 60664-1) up to the connection of the end devices. The additional use of decentralized energy supplies, respectively, local energy storage devices increasingly leads to greater fluctuations in the energy supply even under normal operating conditions. The requirements in respect of the TOV resistance of overvoltage protection devices increase continuously due to the changing mains conditions. The transient overvoltage protection, in particular in connection with spark gaps, is therefore generally activated only at voltages above the mesh voltage of the mains, thereby obtaining a stable mains operation along with sufficient protection from transient overvoltages in the energy distribution system.

If required, temporary overvoltages in the mains supply, caused by failures, are generally removed after some 10 ms, or even only after clearly longer periods, by activating the protection devices of the mains. This will in general be sufficient for the protection of the systems of the mains supply. A protection of sensitive end devices by means of these solutions cannot be satisfactorily guaranteed.

End devices comprise more and more frequently sensitive electronic components which are protected by the described protective measures only to a limited extent, respectively, inadequately. End devices often comprise active semiconductor controllers for controlling the operating behavior and ensuring a stable supply voltage. The components used for this purpose are partially based on manufacturer-specific integrated protection circuitry which only have a limited power capability. In the event of external disturbances, e.g. as a result of transient overvoltages, the mains conditions become problematic as to an optimum overvoltage protection for the end devices, not least because of the different automatically executed control processes. If protection-insulated devices are used, or galvanic separation, or local power supply systems having different operating voltages, respectively, higher operating frequencies, or DC systems, an optimum overvoltage protection becomes even more difficult. An evaluation of the applied voltage, the currents or the frequencies is often not suitable to distinguish between normal operating conditions and transient overvoltages due to the small differences in such systems. The normal possibilities available for transient overvoltage detection furthermore prove to be insufficient given these complex requirements as far as the protection of end devices is concerned. Therefore, a precise detection of transient incidents by means of the conventional overvoltage protection used for the mains supply often only takes place after an end device was overloaded.

Especially for complex, respectively, high-quality end devices the above situation is not very satisfactory. The requirements in respect of the protection needs are partially very individual. From the point of view of an overvoltage protection of the mains supply an individual solution for each end device is not sensible, however.

The problems involved by the protection of sensitive devices from overvoltages have been known for long. The overvoltage protection in a low-voltage supply system is often implemented in the classical way, in the form of a so-called staggered lightning protection zone concept, which is described, for example, in VDE 0185, Volume 103 and Volume 106. From the feed-in towards the end device the protection level and the performance of the overvoltage protection devices are reduced in steps. The overvoltage protection devices, which are frequently referred to as coarse protection and fine protection, are decoupled relative to each other by inductors. The mode of operation is adapted such that the fine-protection element responds first once a response voltage is reached, and is then loaded with a discharge current. If the sum of the residual voltage drop and the voltage drop across the decoupling inductor reaches the higher response value of the coarse-protection element, the coarse-protection element, too, responds, and a partial current as high as possible is discharged through the coarse-protection element.

Combinations of coarse- and fine-protection elements including decoupling inductors are known from DE 1 947 349 and FR 2 544 923, where additionally an overvoltage pulse is generated by an ignition transformer to ignite the coarse-protection element when a current through the fine-protection element is exceeded.

An arrangement is known from DE 198 38 776 in which inductors between the coarse- and fine protection elements are waived. If high-energy overvoltage events occur the fine-protection element, again responding first, is relieved by an evaluation of the energetic load on the component, e.g. by measuring the voltage and/or current. At a threshold value an ignition device activates the upstream coarse-protection element with the aid of a pulse transformer.

The generation of the overvoltage pulse for the ignition of the coarse-protection stage is here always based on an overvoltage present in the mains and on a known overload behavior of the fine protection element, inter alia, the current-carrying capacity. Owing to the operating principle of the signal acquisition, respectively, the kind of ignition pulse generation the ignition of the coarse element is always coupled to the frequency, respectively, rate of rise of the disturbance, so that a purely energetic evaluation of the disturbance will not be successful.

The above-mentioned solutions have several drawbacks. The level of the response voltage of the fine-protection element is fixed on the basis of specifications in the standards, manufacturer recommendations and experience. The activation of the coarse-protection element requires a certain load of the defined fine-protection element, and thus allows a good coordination of the conventional overvoltage protection elements in the mains supply.

However, if unknown fine-protection elements are used in the end devices such solutions are problematic as it is impossible to evaluate the energetic carrying capacity of the end devices in terms of peak and continuous electric strength and operation-dependent current level. In the transition from the low-voltage mains supply to the end devices an exact evaluation of abnormal current flows in the series arm becomes increasingly impossible. The detection and evaluation of currents in the shunt arm are problematic, too. This concerns both the level thereof and the frequency thereof. The general further reduction of the voltage protection level is only limited due to the standards, which also include TOV voltages, and possible only with great efforts, as a frequent response of the overvoltage protection system should be avoided owing to the mains stability and aging.

If the protection level of the fine-protection stage, which is defined in the lightning protection zone concept, is above the peak electric strength of semiconductors or the continuous electric strength of capacitors integrated in the end device, same are destroyed without a detectable current flow. If unknown overvoltage protection elements in the end device respond the level of the current-carrying capacity and the additional decoupling inductance are unknown. In a mains supply without a decentralized feed-in, and with clear mains conditions, the rates of rise of the currents and, to a limited extent, also the levels of the currents can be relied on for an evaluation at least if common overvoltage protection elements, such as GDT and varistor, are used. Also, apart from the insecurity in the choice of the criteria, it is a disadvantage that the presently known solutions for activating the coarse protection of overvoltage protection devices, which are also intended to realize the end device protection in compact systems, require overvoltages for the end device to respond. If the electric strengths are very low, or if low response voltages are paired with a low current-carrying capacity, for example with internal protection diodes of semiconductor devices, the current, the voltage, the frequency or quantities derived from same are insufficient. The known criteria can sometimes only supply a driving signal after the end device has already been overloaded.

The common criteria, e.g. voltage level, level, respectively, waveform of the current, or also the energetic load of a downstream fine-protection element, may thus only provide insufficient information about systems, respectively, about the risks for the components in end devices.

In the case of a further sub-distribution, a change of the frequency, the voltage level or of decentralized feed-ins these common criteria are, therefore, nearly automatically insufficient.

The use of actively controllable switching elements for activating ignition devices of the coarse-protection elements is already known, too. In this case, also semiconductors have already been used as voltage-switching components. The use of these components in conventional trigger devices is critical, however, for several reasons. The electric strength of the components is problematical, and the activation is associated with a dead time which, given the very steep processes, leads to destruction unless additional and, in most cases, complicated protective measures are provided.

The use of pulse transformers for generating ignition voltages does not allow a sufficient rate of current rise due to the switching behavior of the components, so that providing a sufficient ignition voltage is possible only with great effort and additional energy storing devices. In addition to the voltage-switching element the trigger devices further include other components, e.g. varistors, capacitors etc., which serve the coordination with downstream components to divert small energy disturbances and to fulfill normative requirements. These components ensure the function in the event of transient overvoltages and generally prevent an ignition of the spark gap even if the voltage-switching element is falsely triggered at operating voltage. Hence, the choice or the modification alone of the voltage-switching element of an ignition device of a conventional overvoltage protection device is not expedient as, on the one hand, the expenditure increases and, on the other hand, no independent and thus optimal configuration is possible.

An improvement of the protective effect is often possible only if the limit values of the carrying capacity of the devices to be protected are known. A respective adaptation of the overvoltage protection devices leads to application-specific solutions, which are not suited for broad and more general protection goals, however. Reducing the protection level decreases the TOV resistance, while the probability of undesired power supply system failures increases. Protection goals requiring activation at nominal voltage, or below the nominal voltage, cannot be realized with known solution approaches.

BRIEF SUMMARY OF THE INVENTION

It is, therefore, the object of the invention to propose an overvoltage protection device which includes an additional trigger device that is independent from the usual transient protection. This trigger device is to permit the activation of the overvoltage protection device independently of the mains conditions (nominal voltage, temporary overvoltage, transient overvoltage) at the respective installation site. The additional trigger device and the ordinary basic function of the overvoltage protection device are to act completely independently of each other.

In addition to its basic function, i.e. the transient overvoltage protection, which the standardized protection device realizes by means of its common ignition devices, the additional independent activation device is to permit a simple adaptation to application-specific protection requirements. This results in a clear improvement of the transient and the individual temporary overvoltage protection for the protection of end devices, even in galvanically separated mains, or mains with different nominal voltages and frequencies, as soon as, or even before the overvoltage event occurs. The overvoltage protection device to be provided is furthermore intended to realize additional protection goals. The additional activation possibility allows the operation of the overvoltage protection device, for example, with internal or external arc fault detection devices.

The solution to the object is achieved by a combination of the features defined in patent claims. The dependent claims define useful improvements.

According to the invention an overvoltage device on a spark gap basis is supplemented with a common ignition device for trigger purposes at transient overvoltages, with an additional possibility to directly activate the spark gap. This additional possibility of igniting the spark gap works without auxiliary voltage or additional energy storage devices, and allows the ignition of the spark gap without the presence of overvoltages or pulsed currents.

The additional activation of the spark gap is preferably realized only upon signaling (external signal, internal monitoring) and the presence of a minimum voltage, which is necessary for the reliable and fast ignition of the spark gap. The spark gap can be ignited at nominal voltage or even undervoltage. The spark gap itself allows a fast and reliable ignition, even if the voltage is far below the operating voltage.

The dead time of the additional ignition device and the spark gap is negligible. Preferably, a semiconductor is used as switching element for the additional trigger device. This additional trigger device is protected against transient overvoltage events by the common ignition device of the overvoltage device.

The ignition device can be provided with a further auxiliary electrode inside the spark gap or, in a suitable configuration, also make use of the auxiliary electrode of the common ignition device in the event of transient overvoltages.

Due to the very short dead time of the additional trigger device the possibilities of use depend almost exclusively on the period until the signaling and on the basic properties, e.g. the level of the minimum voltage for the ignition of the spark gap. The function permits an additional activation, regardless of the current loads at the installation site of the protection device.

The activation of the additional ignition device may be accomplished by an evaluation unit which is situated in the input region of the EMC protection zone, in a downstream EMC protection zone, another EMC protection zone with a separate decentralized voltage feed-in, or also directly at the installation site of the overvoltage protection device. The device may furthermore be triggered through a defined signaling from an end device to be protected, a voltage supply system for several end devices, or a separate mains, e.g. a DC system.

Due to the short dead time of the additional ignition device it is, of course, also possible to already improve the protective effect of the device at transient events, if sensitive facilities are concerned.

Due to the functionally independent configuration of the additional trigger device from the basic function of the overvoltage protection device it is advantageously possible to realize a modular architecture which also permits an overvoltage protection device to be retrofitted with a trigger unit. This allows a cost-efficient manufacture of the overvoltage protection device and a flexible expansion of the functional range of a system, even a longer time after the start-up.

The inventive concept comprises the selection and a corresponding further development of a spark gap, including the triggering thereof, in order to realize an overvoltage arrester as well as the additional trigger device. The selection and coordination of these basic components determine the basic fields of application of the overvoltage arrester, and also the possible applications ensuing from the functional expansion.

According to the solution, a spark gap is used which allows the ignition of the discharge between the main electrodes below the system voltage of the device/system to be protected. After the ignition, the arc voltage between the main electrodes has to be lower than the system voltage, at least temporarily. This is a basic requirement for the realization of protective functions, which are to be aspired, without noteworthy voltage excesses, at the installation site of the device by the activation thereof. Overvoltage arresters having residual voltages, respectively, arc voltages above the operating voltage are therefore not suited for the application relevant in the present case. Spark gaps with longer main electrode distances are subject to increased arc voltages, especially when encapsulated, and require a considerable ionization effort. Therefore, these arrangements are usable only to a limited extent and with great effort.

The minimum supply voltage at which a spark gap can be ignited is influenced by a number of factors. This minimum voltage, permitting a fast and reliable ignition of the spark gap, determines the fields of application of the additional trigger device. If, for example, the extinction of an arc fault in a low-voltage system is desired, this voltage should be lower than the average arc voltage. The above-mentioned voltage is in the range of approximately 70 V. For personal protection, the permanently permissible voltages are in a similar range, depending on the type of voltage and the frequency.

In order to ignite a spark gap at low applied voltages a sufficient ionization between the main electrodes has to be realized. In addition to the geometry both the intensity and the length of time are of decisive significance for a successful ignition of the spark gap. Spark gaps having a low arc voltage and a low ionization requirement are, for example, triggerable vacuum spark gaps, respectively, gas discharge arresters. These spark gaps are not suited for the overall application, however, due to the small ability to limit follow currents and extinguish follow currents. Furthermore, according to the prior art, the spark gap to be used is to be compact and encapsulated. It is desired that it has a high lightning current-carrying capacity and a high ability to extinguish follow currents and limit follow currents.

Thus, a spark gap with a favorable geometrical arrangement of main and ignition electrode/s is chosen. The greater the main electrode distance, the greater is the required minimum voltage for a reliable ignition of the arrangement, and also the level of the arc burning voltage. As was stated above, these values have an influence on the achievable protection goals. At same environmental conditions, e.g. gas, gas pressure and materials of the spark gap, also the geometrical arrangement of the electrodes, the current-carrying capacity and the design of the discharge space have an impact on the efficiency of the charge carrier introduction to achieve a sufficient pre-ionization. It is favorable to choose a spark gap with an arrangement in which the charge carriers of the pre-ionization move, with high density and short dead time, via the auxiliary electrode directly between the main electrodes. To limit and extinguish mains follow currents suitable spark gaps generally require additional measures, e.g. the movement and extension of the follow current arc.

If the minimum voltage required for a successful ignition of the protection device should be as low as possible, for example, in order to allow the extinction of an arc fault, respectively, support personal protection measures, an encapsulated spark gap with diverging electrodes and an electrode distance <1 mm may be used. The overvoltage protection arrangement may be supplemented with an arc extinction chamber for extinguishing mains follow currents. Spark gaps of this type are suitable for AC and DC system applications, have a high lightning pulse current-carrying capacity, and can be applied in mains with high prospective follow currents. At an operating voltage, for example, of 230 V AC, and a prospective follow current of 25 kA, such a spark gap has a high follow current limitation.

The ionization of such a spark gap can be optimized in correspondence with the geometrical arrangement, for example, such that the effort required for the ignition by pre-ionization is at a minimum, especially also at low driving voltages. In addition, the geometrical arrangement of the ignition region is suited to effect a sufficient ionization of the spark gaps, and thus the ignition thereof, with relatively low and time-limited trigger currents. To carry out a successful triggering of this preferred spark gap by an additional ignition device at as low as possible driving voltages it must be ensured that an ionization resulting from an arc in the spark gap is possible after the activation of the additional voltage-switching element.

The above-mentioned requirement is fulfilled if, after the signaling, an ignition attempt by the activation device is made only as of an instantaneous voltage value specified in correspondence with the possibilities of the arrangement. By this measure a high ignition reliability, a short ignition period and an only short influence on the mains supply are achieved with little effort.

The total dead time, starting at the signaling up to the ignition of the spark gap, hardly changes as compared to a continuous or repeated ignition since, despite a higher energetic and circuitry-wise effort, a successful ignition cannot be effected before the required minimum voltage is reached. If higher voltages or temporary voltage excesses occur, this AND operation will not cause an additional time delay to take place. Ignition attempts below this minimum voltage consume energy, respectively, extend the time until the ignition considerably. If, for example, the activation device becomes active at a zero crossing in an alternating current circuit a successful ignition within a few µs after the activation attempt is impossible. In order to obtain an ignition just the same, the length of time of the ignition process and/or the level and duration of the energy input has to be increased with great effort. Also, a sequence of ignition attempts at short intervals could be attempted. Apart from the effort, these measures would also cause the behavior of the protection device to differ from a conventional activation. A longer or multiple activation, respectively, a very high energy input would change the behavior of the arrester, e.g. upon a follow current load, which may put the reliable mains supply at risk.

The small distance of the main electrodes of a spark gap having diverging electrodes, for example of 0.5 to 0.8 mm, and a slight divergence of the electrodes, can guarantee an arc voltage of <50 V over a defined time of, for example, one millisecond. The minimum voltage for this protection device can be selected within the range of this voltage. Therefore, e.g. at a nominal voltage of 230 V AC, such an arrangement has a nearly negligible time gap around the natural zero current in which an ignition following an internal or external signal would be delayed by the AND operation with the applied voltage.

If it is desired to switch off the mains supply, for example if the protection device is at risk of being overloaded, in the event of a longer lasting fault condition, or in the interest of the aspired protection goal, e.g. personal protection, it is possible to activate the overcurrent protection device of the mains by actuating the activation device continuously or repeatedly. With this aim, the simultaneous activation of switching devices of the mains is sensible so as to temporarily relieve the protection device.

As is known, the ignition of the spark gap of the protection device is realized with at least one auxiliary electrode which is connected, however, to at least two independent ignition, respectively, activation devices. The first triggering of the spark gap corresponds to a common ignition aid for spark gaps and, in the event of transient overvoltages, has to ignite the spark gap automatically, taking into account the normative requirements for overvoltage protection devices. The second, functionally independent ignition device includes a separate active switching element and an impedance allowing a current flow between the connected potentials of the spark gap at voltages below the operating voltage. The ignition of the main spark gap is accomplished after the signaling to the switching element by the shared, or also a separate auxiliary electrode, and without an energy storage device, nearly without delay.

The switching element of the additional actuating device is preferably configured as an active semiconductor component and, for the ignition of the spark gap, can be activated once for a short period, repeatedly for a short period, or for longer periods. In general, the current through the active switching element is automatically extinguished upon the ignition of the main spark gap. However, the current flow may also be limited passively or actively in respect of level and length of time. Alternatively, the ignition of the spark gap may be detected and the active switching element locked.

Upon a non-recurrent activation, the voltage at the installation site of the protection device is reduced to the arc voltage of the spark gap. Thus, the voltage is reduced for a short time to values below the mains voltage. The reduction allows disturbances to be diverted, loads of end devices to be decreased or avoided, or other protection devices to be activated. The follow current, which occurs as well, is then extinguished by the spark gap fast and in a current-limiting manner. Regardless of the activation path, viz. the ignition by the trigger device for the conventional transient overvoltage protection and the ignition by the additional ignition device with the additional voltage-switching element, the function of the spark gap is not different in terms of its behavior when connected to the mains.

The possibility of the repeated ignition, respectively, activation over a longer period may serve to specifically trigger separate protection devices. For example, the activated switching device may directly serve as a short-circuiting device, or a passive short-circuiting device of the overvoltage protection device can be excited by an increased energy input. In both cases, an upstream fuse, overcurrent protection device or fault current protection device of the mains is directly induced to respond so that, at any rate, the system is switched to become voltage-free.

The active switching element of the separate trigger device has an activation voltage, respectively, inhibiting voltage which is above the protection level of the overvoltage protection device, and in particular also above the parallel conventional ignition device. Ideally, the conventional ignition device also assumes the overvoltage protection for the additional ignition circuit. Thus, the active switching element is protected from a faulty behavior or an overload. The conventional ignition device furthermore also limits the voltage increase in processes involving great rates of rise ensuing from the signal detection time and processing time as well as the dead time involved by the switching of the separate trigger device.

Both ignition devices for the spark gap, each with separate voltage-switching elements, are functionally completely independent of each other due to their construction, and do not influence each other. Also, there are no additional demands on the spark gap, given their basic suitability and the possibility of using one common auxiliary electrode. Thus, it is possible to optionally provide a protection device suited for the conventional overvoltage protection with an additional functional expansion, which is usable in various ways, without any noteworthy additional expenditure and without the risk of failures, respectively, restricted functions.

For activating the overvoltage protection device by the additional ignition device with the separate voltage-switching element a defined interface on the overvoltage protection device is passed to the outside. This interface is configured, for example, optically. For additional, above-mentioned external triggering possibilities an additional adapter may be provided internally or externally. The trigger signal for the activation can be supplied by separate monitoring units or an end device itself.

Alternatively, in particular in a preferred embodiment involving a common trigger electrode, it is possible to configure the second ignition device as an additional, separate housed part, and couple same to the overvoltage protection device comprising the conventional ignition device for supplementing same.

This allows a continuously adjustable voltage protection characteristic curve, for example for very sensitive apparatus, by taking into account the protection level of the transient overvoltage protection. Also, it is possible for the operator of the system to set the operational current load and consider criteria for an overload risk deviating therefrom, which result in the triggering of the protection device. These criteria can be adjusted any time to new requirements if equipment is exchanged or the system is expanded. The application of the monitoring unit may here be realized directly on the devices to be protected or in the specific supply networks thereof.

In addition to the activation for realizing overvoltage protection goals, in the same mains or across mains, the separate activation of the overvoltage protection device may also be used for other protection purposes. As was described above, the device can be utilized for selectively switching off the mains supply, by the indirect, respectively, simultaneously direct activation of overcurrent- or fault current protection devices. The activation can be used, for example, for the extinction of arc faults. Due to the short dead time upon the ignition and the very low arc voltage of a spark gap, which is clearly below the usual arc voltage of arc faults in low-voltage systems, the current commutes from the fault location into the spark gap within a few µs, and the arc fault is completely extinguished. In low-voltage systems the installation is, in most cases, not damaged after a short-period arc fault so that the continued operation of the system after a so-called transient wave is frequently possible without problems. The function of the chosen spark gap is therefore suited to remove a plurality of arc faults without the loss of the voltage supply in the low-voltage range, and the control of the system can be carried out after the fault indication at the scheduled maintenance. The preferred spark gap has, for a period of approximately 1 ms, a voltage of some 10 V, which is suited to extinguish arc faults with voltages >70 V, and in general even >150 V, at the beginning of the fault. The period is furthermore sufficient for the complete commutation of the fault current into the spark gap. In order to extinguish follow currents, the spark gap subsequently increases the voltage only "smoothly", and minimally above the mains voltage. Therefore, in low-voltage systems, there is sufficient time for a re-solidification of the previous spark-over gap. In the case of greater damages that cannot be removed by a short-term commutation, the switching element can be triggered multiple times, respectively, for a longer time. If this is not successful, the trigger period can be extended until an overcurrent protection device is activated. The detection of arc faults can be realized by external apparatus, separate monitoring units, or also directly in the overvoltage protection device itself.

The separate trigger function of the very powerful spark gap can, of course, also be actively used by downstream overvoltage protection devices in the series arm or shunt arm, which have a low performance and low protection level. The activation may also be realized by devices provided in downstream supply networks, which may have different frequencies, voltage levels or voltages types and are fed, for example, from the mains having the installed protection device.

The invention will be explained in more detail below by means of exemplary embodiments and figures.

BRIEF DESCRIPTION OF THE SEVERAL VIEWS OF THE DRAWINGS(S)

DETAILED DESCRIPTION OF THE INVENTION

Figure 1:
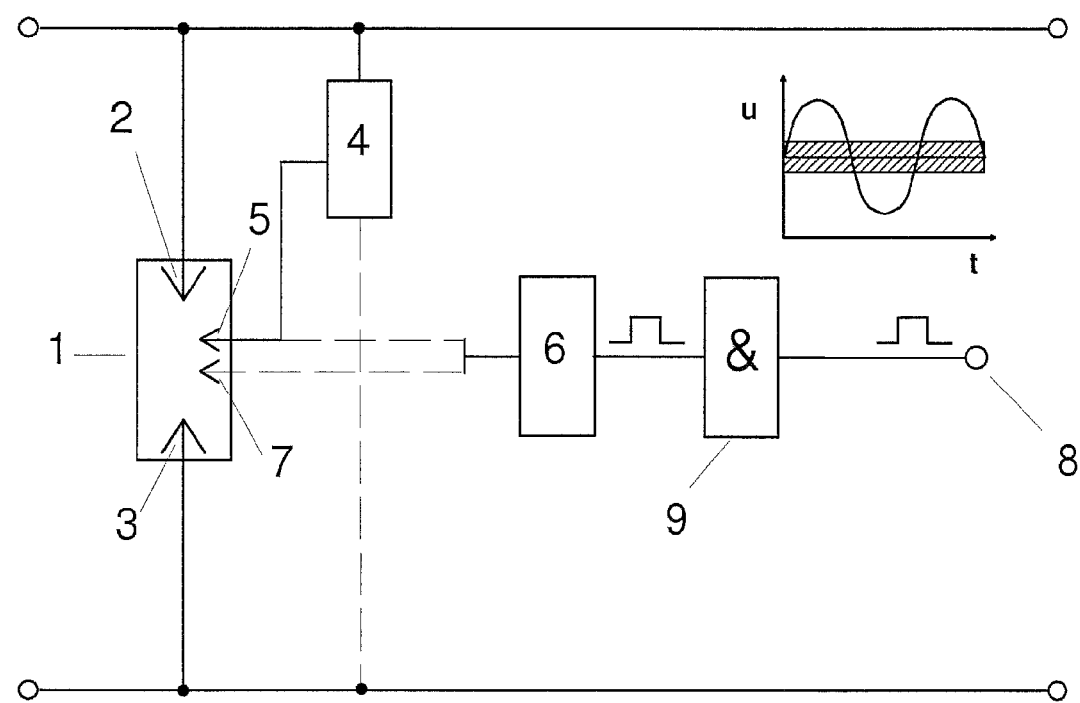
FIG. 1 is a schematic block diagram depicting the basic arrangement of the protection device formed in accordance with the present invention.

FIG. 1 illustrates a schematic block diagram depicting the basic arrangement of the protection device. An encapsulated spark gap 1 including at least two main electrodes 2 and 3 comprises a conventional ignition device 4 for the transient overvoltage protection. The ignition of the spark gap is realized by the auxiliary electrode 5 to which the ignition device 4 is connected. The arrangement fulfills all requirements of a conventional lightning current arrester for use in low-voltage mains.

The spark gap 1 can also be activated entirely, and independently of the ignition device 4, by the additional ignition device 6. The activation of the spark gap 1 by the ignition device 6 may also be realized with the aid of auxiliary electrode 5, or alternatively also by a separate auxiliary electrode 7. The activation of the ignition device 6 imperatively requires a signal at the input 8. If a signal is available at input 8 the activation of the spark gap is triggered, in the preferred embodiment, by device 6 only in combination with a minimum voltage between the main electrodes 2 and 3 which is present at the spark gap. The evaluation of both conditions "signaling" and "minimum voltage" is realized by an AND operation 9 in an analog or digital manner.

Figure 2:
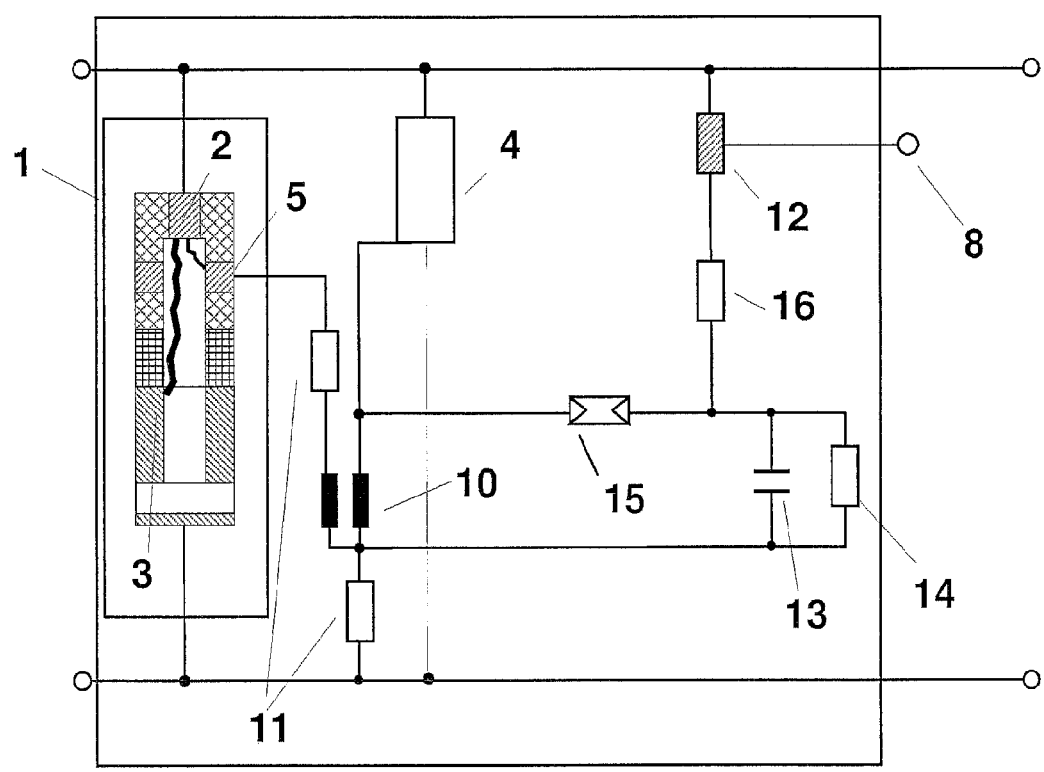
FIG. 2 is a schematic block diagram showing a basic arrangement of the electrodes in an encapsulated spark gap of the overvoltage protection device formed in accordance with the present invention.

FIG. 2 shows a basic arrangement of the electrodes in an encapsulated spark gap 1 of the overvoltage protection device. The spark gap 1 comprises a frequently used trigger aid based on an ignition transformer 10.

The spark gap 1 has one or, if necessary, two auxiliary electrodes 5, both being insulated from the two main electrodes 2; 3.

Spark gaps having a trigger device of this type are generally ignited with a high amplitude voltage pulse from one or more pulse transformers. After the sparkover of the auxiliary spark gap with the spark between the auxiliary electrodes, respectively, between an auxiliary electrode and a main electrode as a result of a voltage pulse, low-voltage air spark gaps require, as opposed to high-voltage applications or vacuum spark gaps, in general a current flow from the mains via the high-voltage winding of the transformer so as to have a sufficient ionization energy and ionization time available for the ignition of the main spark gap.

As is known, the required energy and time increase as the voltage present between the main electrodes decreases. As the basic properties, and also the behavior of a spark gap in the main function of the transient overvoltage protection are greatly determined by the trigger arrangement it is not sensible, when using an additional triggering possibility, to change the type, respectively, geometry of these spark gaps. The utilization of these proven "conventional" spark gaps including the separate activation according to the invention is able to expand this arrangement with little effort. The possibilities to realize additional protection goals in this non-optimized embodiment are, of course, limited by the basic functionality of the spark gap. It is imperative, however, as was described above, that the arc voltage drops at least temporarily below the mains voltage. Beside this lower value the utilization possibility is determined by the ignition dead time, the level and duration of the residual voltage, and the arc voltage demand of the spark gap and the trigger device.

A spark gap having cylinder-symmetrical electrodes comprises, according to FIG. 2, for example only one trigger electrode 5, which is preferably inserted asymmetrically between the main electrodes 2 and 3. Upon the ignition of the auxiliary gap between the auxiliary spark gap 5 and the main electrode 2 the gap between the main electrodes 2 and 3 is ignited. The ionization energy is quite low due to the spatial limitation on all sides and the small volume of the cylindrical arc space between the electrodes.

After the ignition of the arc between the main electrodes by an arc voltage below the mains voltage the arc voltage can be increased, among others by extending the arc inside the hollow electrode 3, for the follow current extinction and limitation. If higher voltages, too, are sufficient for the application, where an ignition has to be accomplished by the external ignition device, the distance between the ignition electrode 5 and the main electrode 3 can also be extended, for example, with an electrically conducting polymer supporting an extinction of the follow current, for example, by a gas discharge. However, the electrical conductivity and the sparkover behavior of the additional material have to be adjusted such that a voltage below the nominal voltage remains sufficient for the ignition process of the main spark gap. For some applications arrangements may be chosen where the ignition of the main gap is sufficient, for example, only as of an instantaneous value of the voltage which corresponds to the root mean square value of the nominal voltage of the mains.

The ignition at voltages between the root mean square value and the peak value of the nominal voltage at 230 V AC is insufficient, however, for a safe and fast arc fault extinction.

The spark gap according to FIG. 2 is triggered by a conventional ignition aid 4 with the ignition transformer 10. The polarity of the voltage pulse of the ignition transformer is preferably chosen such that the subsequent current from the mains via the high-voltage side of the transformer does not involve a zero crossing. Especially at low voltages applied between the main electrodes 2 and 3, this measure supports a reliable ignition. It is favorable if the transformer itself has a low inductance and low impedance, in particular at low voltages.

Additional impedances 11, as required for example in some spark gaps having high residual and arc voltages for limiting the currents, may also be waived in the illustrated spark gap due to the low arc voltages. In other spark gaps same should not cause power interruptions in the desired range of the voltage applied between the electrodes at which the ignition is to take place. To allow the realization of such a conventional arrangement with an additional triggering possibility, which does not influence the basic function of the spark gaps and the transient ignition aid 4, and which also offers the possibility of a later supplementation, the arrangement shown in FIG. 2 is proposed.

The primary side of the pulse transformer 10 is, in this regard, connected to an additional trigger circuit which is realized in the device, or in a separate housing if a separate connection is provided at the housing of the spark gap. The separate housing may be retrofitted to the housing of the spark gap.

The trigger circuit includes an actively voltage-switching component 12, and the possibility of triggering 8 same internally or externally. Upon actuating the trigger device a current from the mains is used for charging a small capacity 13 with discharging resistor 14. If the charging voltage of the capacity reaches the voltage at which an attempt to ignite the spark gap is successful, an ignition pulse for the spark gap is generated by the passive voltage-switching element 15 and the primary winding of the ignition transformer 10.

By the choice of the passive voltage-switching element 15 it is guaranteed, even without voltage measurement, that the applied voltage between the main electrodes is at least at the level of the voltage that allows a reliable ignition with a defined dead time for the respective spark gap. This adjustment between the spark gap and the additional trigger device is necessary for the realization and the limits of the desired protection goals. For limiting the level, respectively, also the duration of the current by the voltage-switching component 12 a linear or non-linear low impedance 16 may be connected in series.

The voltage-switching element 15 is to be chosen such that a sufficient ignition voltage is generated by the trigger circuit in transient processes. Therefore, in the event of a current flow in the transient ignition aid 4 according to the prior art and the voltage drop across the primary winding of the transformer 10 associated therewith, the element 15 must not respond. The voltage reduction associated therewith would result in an energy loss in the transformer and a limitation of the ignition voltage available on the high-voltage side. An adjustment to gas discharge arresters is possible with the common transformers, by the selection of the dynamic response characteristic curve at a different direct response voltage. Depending on the spark gap it is possible to chose, at a mains voltage of 230 V AC, gas discharge arresters of approximately 60 to 350 V.

The above description is based on an external evaluation, respectively, signaling. It may be sensible for some applications, however, to also induce a triggering independent of transient voltage excesses inside a protection device, and thus quasi at the same site of installation and load. In addition to the evaluation of voltages, currents or energies it is possible, for example, to detect and analyze also other mains interferences.

Figure 3:
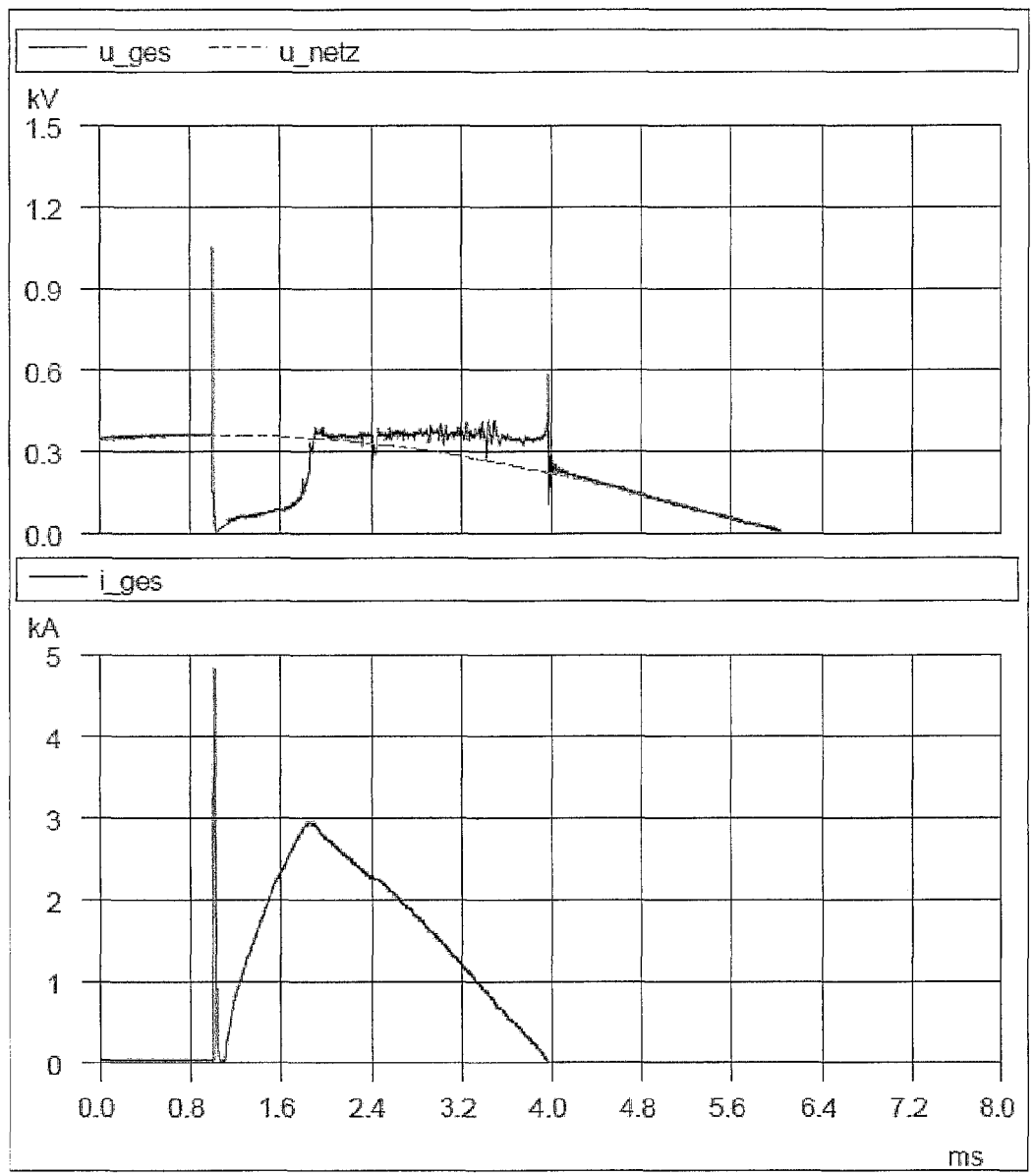
FIG. 3 is a graph showing the basic behavior of the overvoltage protection device formed in accordance with the present invention at a transient overvoltage without being additionally triggered by a voltage-switching device.

FIG. 3 shows the basic behavior of the overvoltage protection device at a transient overvoltage without being additionally triggered by a voltage-switching device 12. This basic pattern is also typical for other conventional spark gaps having ignition aids. FIG. 3 illustrates the behavior at a high-resolution current and voltage measurement in a 220 V mains with 50 Hz and a pulse event at a phase position of approximately 90°. The pulsed current has the waveform 8/20 μs with an amplitude of 5 kA. The peak value of the limited follow current reaches, at a prospective value of approximately 25 kA, approximately 3 kA. The level of the voltage excess at the spark gap amounts, in this case, to approximately 1 kV corresponding to the dynamic characteristic curve of the gas discharge arrester. After the ignition of the spark gap the voltage amounts, for a period of approximately 1 ms, only some 10 V. The level and the duration of the voltage excess with respect to the mains voltage differ according to spark gap and type of ignition. In the known overvoltage arresters having a level of protection <1.5 kV it differs from several μs up to the overall discharge duration of the pulse.

Figure 4:
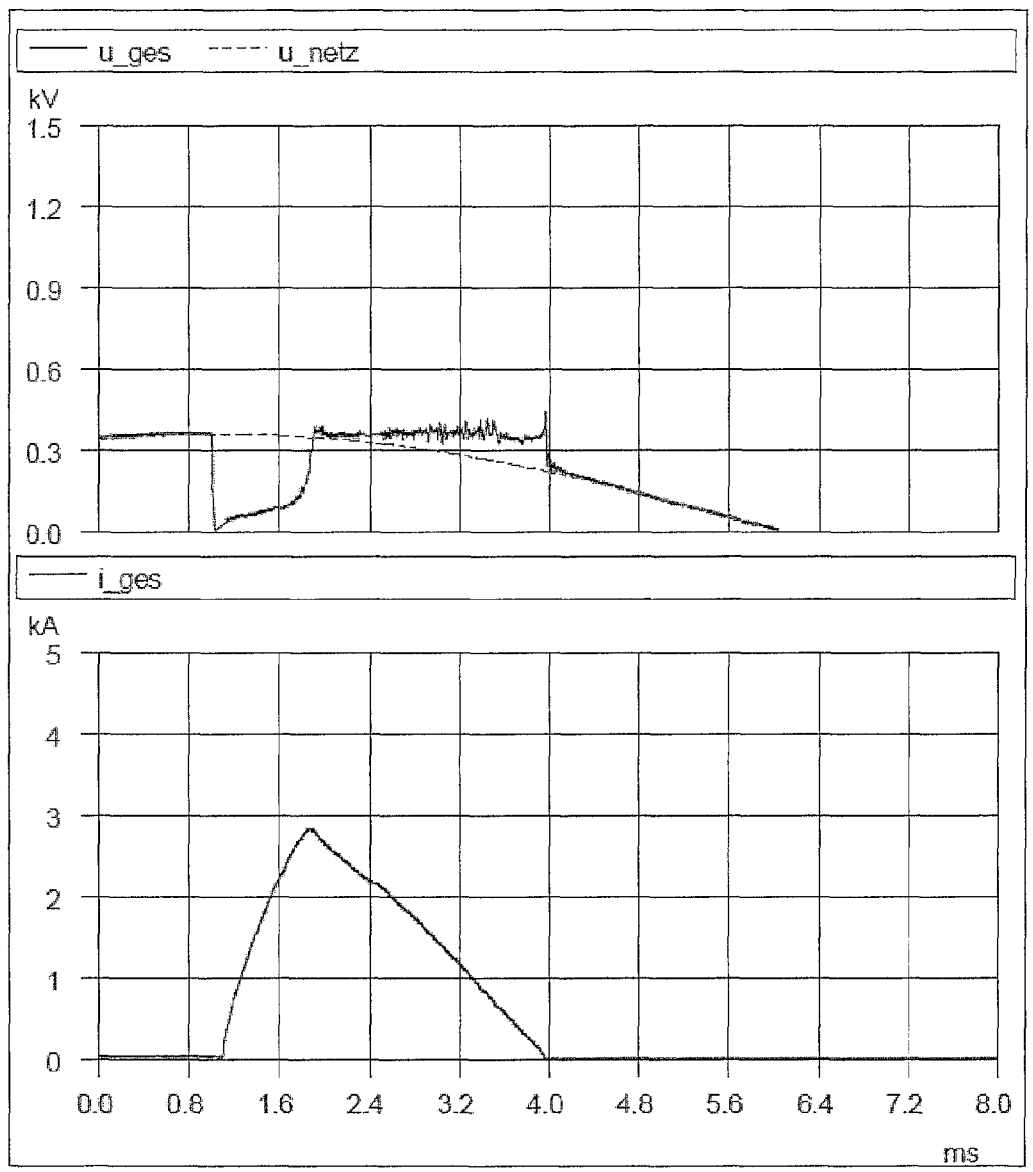
FIG. 4 is a graph showing the activation of the overvoltage arrester by the additional voltage-switching device of the separate additional ignition device formed in accordance with one form of the present invention at mains voltage.

As opposed to this, FIG. 4 shows the activation of the overvoltage arrester, e.g. according to FIG. 2, by the additional voltage-switching device 12 of the separate additional ignition device 6 at mains voltage. The spark gap can be ignited without any voltage excess relative to the instantaneous value of the mains voltage. The behavior at follow current limitation and follow current extinction corresponds to the pattern in FIG. 3.

Figure 5:
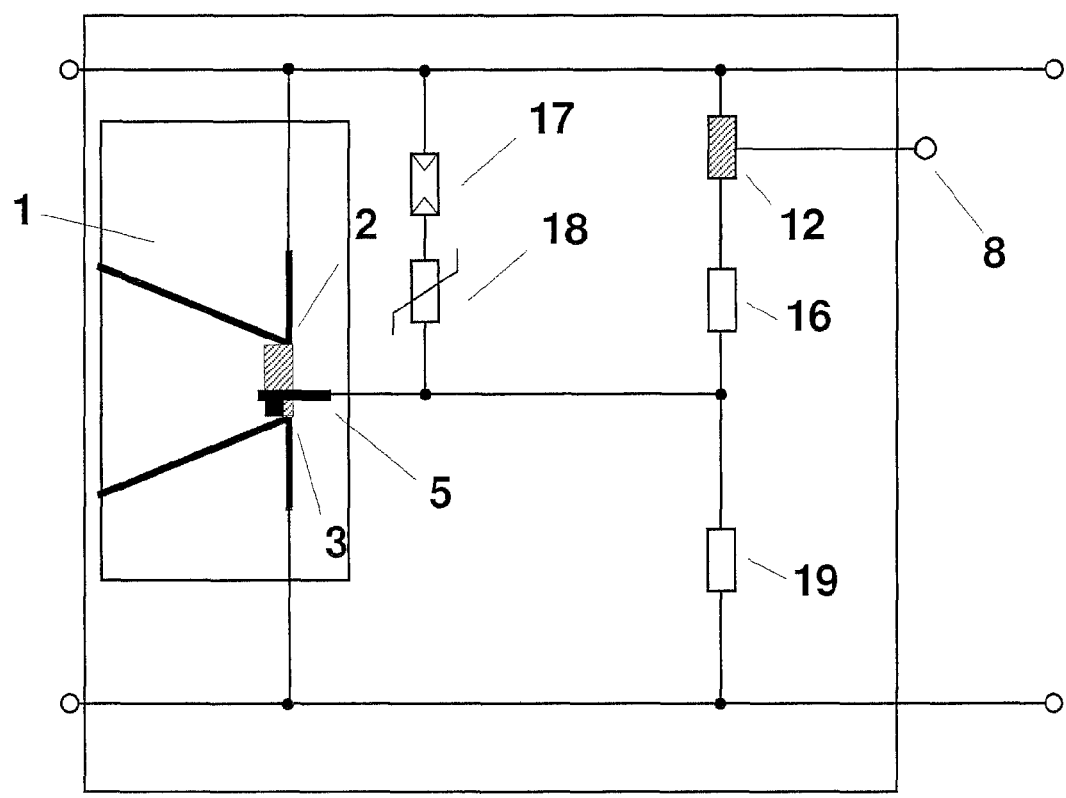
FIG. 5 is a schematic block diagram showing another embodiment of the overvoltage protection device formed in accordance with the present invention.

FIG. 5 shows another embodiment according to the invention. The encapsulated overvoltage arrester 1 comprises, for diverting lightning surge currents, a spark gap with two diverging main electrodes 2; 3, which have a distance of <2 mm, e.g. 0.8 mm, in the ignition area so as to limit the arc voltage of an air gap to a value of <50 V. To limit mains follow currents, the spark gap may be supplemented with an arc chamber, e.g. a deion chamber (not shown). The arc voltage remains limited to a low voltage value in the ignition area and travel area of the diverging electrodes. The arc enters only after approximately 1 ms, so that it is only after this time that the arc voltage is increased "smoothly" by the mains voltage in order to limit and extinguish the follow current.

The spark gap further includes an ignition aid which is preferably formed of a series connection of a gas discharge arrester 17 and a varistor 18. The arc voltage of the ignition spark of the auxiliary spark gap between the auxiliary electrode 5 and the main electrode 3, too, is preferably under 50 V. Parallel to this first ignition aid another voltage-switching device 12 is provided. Both ignition aids are connected to the auxiliary electrode 5. The device 12 includes a voltage-switching element and a drive circuit which can be triggered actively. The triggering can be accomplished, for example, optically by an externally accessible connection 8. A linear or non-linear low impedance 16 may be arranged in series with the device 12, which serves to limit the current, in particular if a low-powered switching element 12 is concerned.

A high-impedance resistor 19 can connect the device 12 to the other potential. The resistor may be used, for example, to realize the holding current if a semiconductor component is used. The auxiliary electrode 5 permits a current flow to the main electrode 3 after one of the two ignition aids has responded. The main spark gap between the electrodes 2; 3 is ignited very fast due to the ionization. Owing to the low arc voltage the respective ignition aid is relieved, and the current commutes to the main spark gap. The peak electric strength of the device 12 is chosen such that, in the event of transient overvoltages, the series connection of the gas discharge arrester 17 and the varistor 18 are sufficient as overvoltage protection for the device 12. In environments in which steep, respectively, frequent disturbances have to be expected additional measures may be taken.

To allow the use of cost-efficient, space-saving and low-power components the duration and level of the current can be limited by the additional ignition arrangement 12/16. The activation of switch 12 may furthermore be controlled by an AND operation of the instantaneous value of the voltage and the signal at input 8 so as to allow a successful ignition of the main spark gap by a nonrecurring process, with a small energetic load of the ignition circuit. The evaluation of the voltage level is here limited to a limit value. Same can be easily detected, respectively, fixed by a measurement, or also by other voltage-switching components (see FIG. 2, component 15).

The total dead time of the arrangement for igniting the main spark gap by the switching element 12 is only a few μs if the ignition signal 8 is applied and the voltage is at the required minimum level. The signaling 8 and the voltage level evaluation may likewise be realized within a short dead time. Even within the period of transient processes this allows an ignition of the spark gap also by the additional trigger device 12. This is of particular interest if the end device to be protected can already be damaged, in the event of transient overvoltages, below the protection level of the conventional overvoltage arresters, e.g. by high-energy disturbances with a small rate of rise, respectively, low amplitude.

In one embodiment of the overvoltage protection device, with a subsequent supplementation of the additional trigger device, the trigger components 12, 8, 16 and 19 may be accommodated in a separate housing. The overvoltage protection device preferably configured, for the application, with a common "conventional" overvoltage protection function requires for the later supplementation only an additionally realizable connecting point to the existing auxiliary electrode 5. It is possible, of course, to connect an adapter (not shown) to the interface 8, which permits the utilization of different signals.

As mentioned above, there are various specific possible applications for the proposed protection device. Therefore, only a few non-limiting examples can be described.

For example, an external detection device for arc faults may be connected via the signal input. By a nonrecurring activation of the protection device so-called transient waves can be very rapidly removed, as was mentioned before, and, as opposed to simple "short-circuiting devices", the operation of the system can be continued. Upon a new detection the protection device can then be activated several times, respectively, permanently, so that the overcurrent protection devices of the mains are triggered. Of course, in order to detect series and shunt arcs, the detection devices may also be integrated in the introduced protection device, including the separate trigger device.

Figure 6:
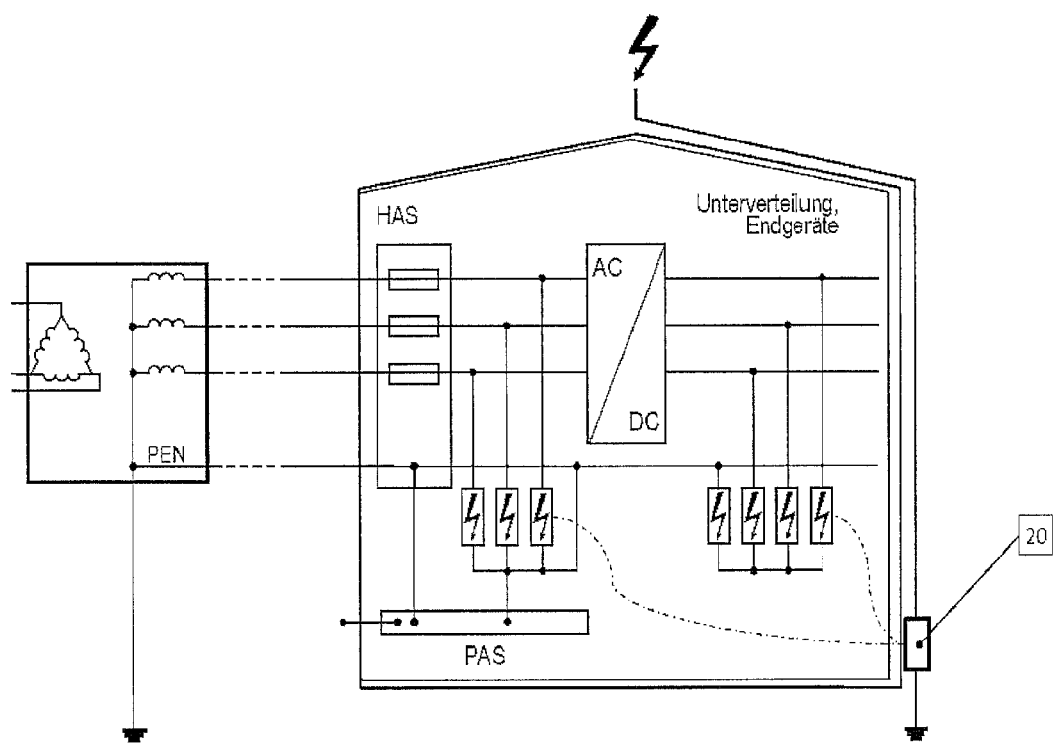
FIG. 6 is a schematic block diagram showing an exemplary arrangement of the overvoltage protection device formed in accordance with the present invention.

Another advantageous application of the device according to the invention is illustrated in an exemplary arrangement according to FIG. 6. An external lightning protection device may be provided with a detection device 20. Upon detecting, for example, a high-energy discharge event all overvoltage protection devices of the installation can be activated via the interface 8. Thus, all overvoltage protection devices are activated simultaneously, in general before the voltage excess in the installation occurs, so that, inter alia, end devices are optimally protected against the influence of transient overvoltages. Even if the overvoltage event and the activation coincide, a potential shift between the individual lines, respectively, phases is avoided by the simultaneous activation.

The proposed protection device also allows the protection of end devices which only have a very small dynamic, respectively, static electric strength. End devices with strengths, the dimensioning of which was exclusively oriented by, for example, the ITIC curve (EPRI), may be subject to considerable deviations, as compared to the protection level provided by the ordinary standardized overvoltage protection devices. Conventional TOV monitoring and protection devices are capable of closing this gap in the event of long-lasting overvoltages (>10 ms). However, no protection is provided between the transient time range and these devices.

The aforementioned gap can be closed by the solution as introduced herein. In this regard, it is an advantage to provide, upon the actuation of the activation device 6, a simultaneous signaling to the protection device for the TOV protection, respectively, to the usual switching devices of the mains. Such a signal can be provided by the device triggering the activation device 6, or also by the introduced protection device itself, if applicable, upon another time-shifted evaluation. This measure relieves the protection device in the event of lasting errors. The protection device comprises a remote signaling and a display device which reacts specifically to the different activation of the ignition devices 4 and 6.

If highly sensitive end devices are concerned, the gap between transient protection and protection at long-lasting increased voltages can be closed with one device, without additional individual, respectively, specific protective measures.

Figure 7:
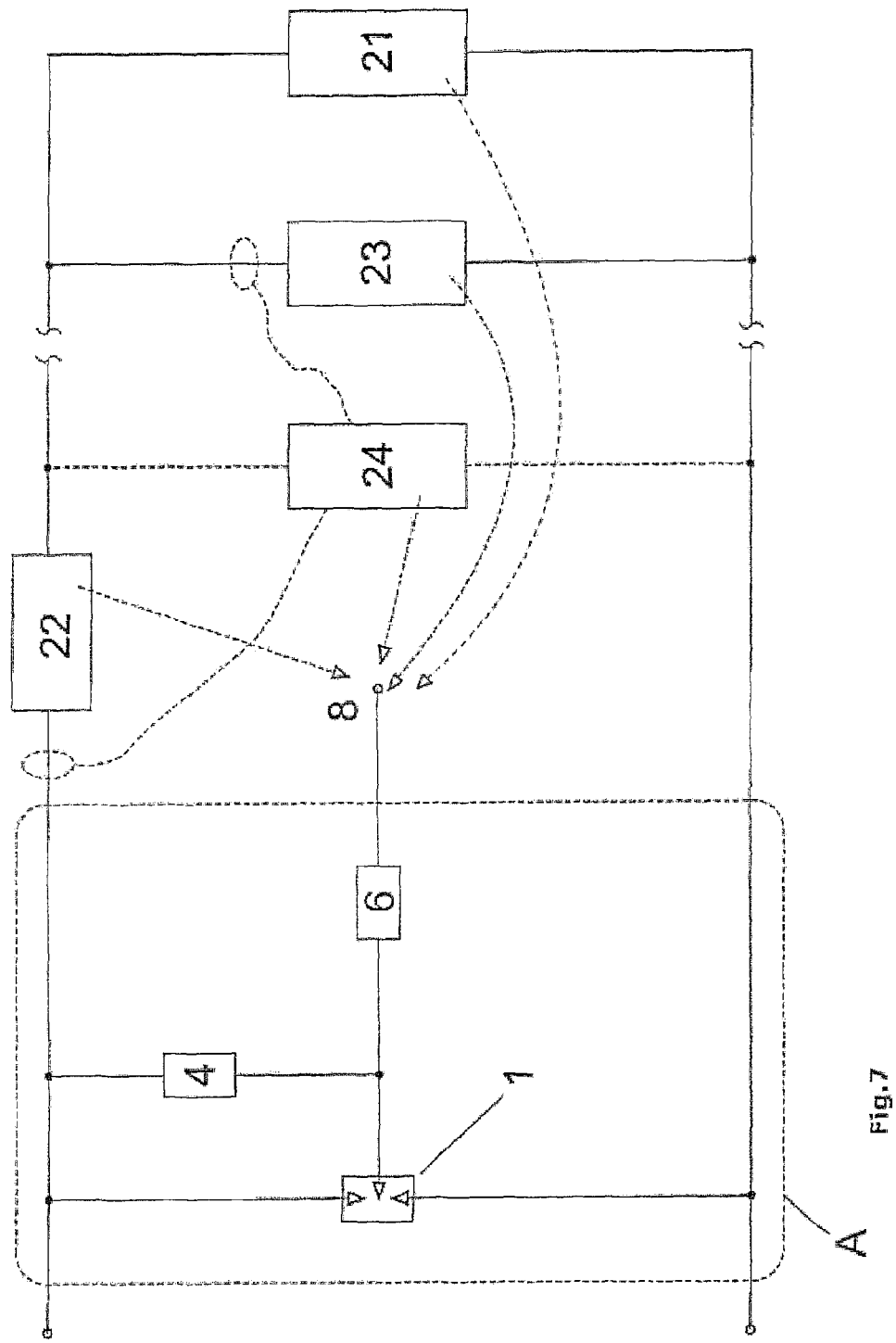
FIG. 7 is a schematic block diagram showing a protection device formed in accordance with one form of the present invention consisting of the spark gap, the ignition devices and the signal input in a single-phase arrangement for the applications.

FIG. 7 shows a protection device A consisting of the spark gap 1, the ignition devices 4 and 6 and the signal input 8 in a single-phase arrangement for the applications explained below.

As explained before, the spark gap 1 of the overvoltage protection device A is directly ignited by the conventional ignition device 4 in the event of transient voltages excesses.

The additional ignition device 6 serves to ignite the spark gap using a signal. The overvoltage protection device A therefore comprises an internal and/or external signal input 8.

Signaling can be accomplished by an internal, respectively, external evaluation device 24, or generally by external devices 21, 22, 23.

Separate overvoltage protection devices, monitoring devices, or also loads, consumers or end devices are conceivable as external devices. The devices may be arranged in the shunt arm or series arm.

The end devices 21, respectively, also the separate overvoltage protection devices 23 may be arranged directly adjacent, or also galvanically separated from the overvoltage protection device A.

The exemplary arrangement in FIG. 7 shows an end device 21 in addition to the overvoltage protection device. By a suited signaling to the input 8 this end device can directly effect the ignition of spark gap 1.

In the series arm a device 22, e.g. a current-limiting device, a PTC element, respectively a passive or active series decoupler may be arranged, which can effect a direct activation of the spark gap 1 by a signaling to the signal input 8.

The spark gap 1 may also be activated, however, by signaling, by an external downstream overvoltage protection device 23. The overvoltage device 23 may be located immediately adjacent, but also at a greater distance. The overvoltage protection device 23 may furthermore also be arranged in a galvanically separated mains or downstream of an AC/DC converter.

The spark gap may be activated via the signal input 8, for example, upon reaching the power limit of the end device 21, respectively, the overvoltage protection device 23.

An evaluation device 24 may be provided to evaluate, for example, the load on end devices 21 or separate, e.g. downstream low-powered overvoltage protection devices (SPD2, respectively, 3). This device can detect and evaluate, for example, currents and voltages in the series arm, at different nodal points, or in the shunt arm. Based on the measured data it is possible to evaluate powers, loads, load changes etc. If values are not permissible, the evaluation device 24 can activate the spark gap 1 via the input 8.

The evaluation device 24 may be designed as an external device, as a clip-on module, or it may be integrated in the overvoltage protection device A.

In particular for so-called combined arresters, having an integrated coarse and fine protection stage, which are increasingly applied in compact low-voltage systems, it is even sensible to also integrate several of the components, illustrated as external ones in FIG. 7, directly in the overvoltage protection device A.

In addition to the overvoltage protection device 23, i.e. the fine-protection stage, an evaluation device 24 and, if required, for example also a device 22 for the series decoupling, current limitation etc. may be integrated. The integration may likewise comprise the sensors necessary for the evaluation device 24, for example, for measuring currents and voltages.

As was mentioned above, the overvoltage protection device A may also be employed for the arc fault protection. The overvoltage protection device may be provided with a possibility of detecting arc faults, allowing the analysis of longitudinal faults and transverse faults. The arc fault detection can, of course, also be realized in a separate apparatus, and the overvoltage protection device can be activated via the interface 8 from the outside. Should the arc fault not be removed upon the single or also multiple activation of the overvoltage protection device and the extinction of the follow current, the overvoltage protection device may be used, by permanent triggering, to trigger the overcurrent protection member of the mains. The overcurrent protection member may be designed as a fuse or switch.

In particular for triggering the overvoltage protection device A via an external signal input 8, a signal adapter (not shown) with different signal input possibilities (different signal inputs) may be provided.

The signaling can be realized, for example, wired, by optical waveguide, radio (wireless) or powerline.

LIST OF REFERENCE NUMBERS

A protection device
1 overvoltage protection element, spark gap
2 main electrode
3 main electrode
4 conventional ignition device
5 auxiliary electrode
6 additional ignition device
7 separate auxiliary electrode
8 signal input
9 evaluation device (AND operation)
10 ignition transformer
11 impedance
12 voltage-switching component (semiconductor) with trigger function
13 capacity
14 resistor
15 voltage-switching element (passive, gas discharge arrester)
16 impedance
17 gas discharge arrester
18 varistor
19 resistor
20 detection device
21 end device
22 device, e.g. for current limitation, PTC, respectively, passive or active series decoupling
23 overvoltage protection device, e.g. type SPD 2 or 3
24 evaluation device

What is claimed is:

1. Encapsulated low-voltage supply system overvoltage protection device capable of carrying lightning currents and limiting follow currents, and comprising at least one spark gap which respectively has at least two main electrodes and one auxiliary electrode, the latter being connected to an ignition device for triggering in the event of transient overvoltages,
characterized in that
at least one second ignition device is provided, which is independent of the first one, which is capable of activating the spark gap without the necessity of the presence of overvoltages or pulsed currents, but the presence of a minimum voltage between the main electrodes of the spark gap.

2. Overvoltage protection device according to claim 1, characterized in that
the instantaneous value of at least one of the minimum voltage and an arc voltage between the main electrodes is equal to or below the root mean square value of the mains voltage for a period of approximately 1 ms.

3. Overvoltage protection device according to claim 1, characterized in that
the second ignition device evaluates, in addition to an activation signal (8), also the instantaneous value of the minimum voltage, and can be activated on the basis of a logical AND operation.

4. Overvoltage protection device according to claim 1, characterized in that
the first ignition device can be automatically activated exclusively in the event of transient overvoltages.

5. Overvoltage protection device according to claim 3, characterized in that
the activation signal is at least one of externally and internally provided; and
the second ignition device includes a voltage-switching device which can be exclusively triggered by the activation signal (8).

6. Overvoltage protection device according to claim 5, characterized in that
on activation by signaling the ignition voltage, the residual voltage and the arc voltage of the spark gap are below the mains voltage.

7. Overvoltage protection device according to claim 5, characterized in that
the voltage-switching device of the second ignition device includes a semiconductor component.

8. Overvoltage protection device according to claim 1, characterized in that
the first ignition device takes over the transient overvoltage protection for the second ignition device.

9. Overvoltage protection device according to claim 1, characterized in that
the second ignition device includes current-limiting means.

10. Overvoltage protection device according to claim 1, characterized in that
an activation signal is at least one of externally and internally provided; and
the overvoltage protection device includes a terminal for an adapter for activating the second ignition device by different externally provided activation signals (8).

11. Overvoltage protection device according to claim 1, characterized in that
the second ignition device allows the ignition of the spark gap below the nominal voltage without ignition transformer and energy storage device, without the presence of a transient overvoltage increase.

12. Overvoltage protection device according to claim 5, characterized in that
both ignition devices are located inside one common housing and the housing has an additional terminal for the activation signal (8).

13. Overvoltage protection device according to claim 1, characterized in that
only the first ignition device is located with the spark gap inside one common housing, and the second ignition device is arranged in a separate housing which has an interface.

14. Overvoltage protection device according to claim 1, characterized in that
the spark gap can be triggered by the second ignition device time-wise before a transient voltage increase occurs.

15. Overvoltage protection device according to claim 1, characterized in that
the spark gap can be triggered by the second ignition device through external monitoring units independently of transient disturbances.

* * * * *